United States Patent [19]

Suzuki et al.

[11] Patent Number: 5,034,063
[45] Date of Patent: Jul. 23, 1991

[54] DISPERSANT-CONTAINING DISAZO PIGMENT COMPOSITION

[75] Inventors: Yoshie Suzuki; Ataru Chiba; Kenji Kitamura; Akimitsu Mochizuki, all of Tokyo, Japan

[73] Assignee: Toyo Ink Manufacturing Co., Ltd., Tokyo, Japan

[21] Appl. No.: 417,078

[22] Filed: Oct. 4, 1989

[30] Foreign Application Priority Data

Oct. 21, 1988 [JP] Japan ................. 63-265576

[51] Int. Cl.$^5$ .......................................... C09B 35/037
[52] U.S. Cl. ................................ 106/496; 534/746; 534/747; 106/23
[58] Field of Search .................. 534/747; 106/494, 23

[56] References Cited

U.S. PATENT DOCUMENTS 4,664,709 5/1987 Castenson ................... 534/746 X

OTHER PUBLICATIONS

Castenson, Chemical Abstracts, vol. 105, #210409c (1986).
Imperial, Chemical Abstracts, vol. 67, #43550e )1967).
Kuehne et al., Chemical Abstracts, vol. 76, #87126m (1972).
Schwarin et al., Chemical Abstracts, vol. 78, #99193k (1973).

*Primary Examiner*—Mary C. Lee
*Assistant Examiner*—Fiona T. Powers
*Attorney, Agent, or Firm*—Wenderoth, Lind & Ponack

[57] ABSTRACT

A disazo pigment composition which can provide a printing ink having excellent fluidity, gloss and storage stability, and which contains:
a disazo pigment obtained by a coupling reaction between a tetrazo compound of dihalogenobenzidine and acetoacetanilides, and
a reaction product from a coupling reaction between an acetoacetylation product and a tetrazo compound of dihalogenobenzidine.

8 Claims, No Drawings

DISPERSANT-CONTAINING DISAZO PIGMENT COMPOSITION

FIELD OF THE INVENTION

The present invention relates to a pigment composition which especially has excellent fluidity and storage stability and further has excellent gloss and tinting strength when used in various applications, e.g. in a printing ink.

PRIOR ART OF THE INVENTION

When a pigment is used in a printing ink, the pigment is required to have good gloss, tinting strength, fluidity and storage stability. Recently, since the pigment content in an ink is sometimes increased to densify the ink, fluidity and storage stability of the pigment are especially required. When the fluidity is poor, the dilution ratio with a solvent is increased to achieve a suitable viscosity for printing, and the gloss and tinting strength are consequently degraded. Various attempts have been heretofore made to improve these properties of disazo pigments.

For example, one attempt is found in a method where an activator, emulsion, etc., are added to improve the fluidity. In treatment of a pigment according to this method, however, pigment particles aggregate or grow to a larger size, and when the pigment is used in a printing ink, the gloss and tinting strength are lost. Another attempt is found in a method where a pigment is treated with an amine to improve the gloss and tinting strength (e.g. Japanese Patent Publications Nos. 1821/1973, 2753/1971 and 48587/1982). However, the defect of this method is that an ink using the treated pigment changes with the passage of time, and its gloss, tinting strength and fluidity are degraded. Still another attempt is found in a method in which the properties of an ink are improved by acetoacetylating the above amine, etc., mixing the aceto-acetylated amine, etc., with acetoacetanilides and coupling the mixture with a pigment (e.g. U.K. Patent No. 1139294 and Japanese Laid-Open Patent Publication No. 246260/1986). However, this method is hardly satisfactory concerning the gloss, tinting strength and fluidity. Further, for example, Japanese Patent Publication No. 49087/1980 discloses a disazo pigment obtained by a coupling reaction between a tetrazo compound of 3,3'-dichlorobenzene and acetoacetanilide, in which the coupling is carried out by using carboxylic acid-containing acetoacetanilide as part of a coupling component. Since, however, this disazo pigment has high selectivity to a dispersing medium, it sometimes gives poor gloss when used particularly in a gravure printing ink.

SUMMARY OF THE INVENTION

The object of the present invention is to provide an improved disazo pigment composition capable of providing a printing ink having excellent fluidity in which the amount of solvent for viscosity adjustment is decreased.

Another object of the present invention is to provide an improved disazo pigment composition capable of giving a printing ink having excellent gloss on an ink coating and excellent tinting strength.

Still another object of the present invention is to provide an improved disazo pigment composition capable of giving a printing ink having excellent storage stability.

According to the present invention, there is provided a disazo pigment composition containing:

a disazo pigment obtained by a coupling reaction between a tetrazo compound of dihalogenobenzidine and acetoacetanilides, and a reaction product from a coupling reaction between an acetoacetylation product of a compound, as part of coupling components, represented by formula (1)

wherein Q represents a noncyclic saturated hydrocarbon moiety having 2 to 10 carbon atoms, or a compound represented by formula (2)

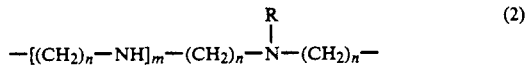

wherein R represents a substituent selected from a class consisting of a hydrogen atom, an alkyl group, an aryl group and an aralkyl group, n represents an integer of from 2 to 4 and m represents an integer of from 0 to 5, and a tetrazo compound of dihalogenobenzidine.

DETAILED DESCRIPTION OF THE INVENTION

The present invention uses, as coupling agents, an acetoacetylation product of the compound represented by formula (1) in addition to acetoacetanilide, and the amount of the acetoacetylation product is 0.3 to 30 mol %, preferably 1 to 20 mol %, based on the acetoacetanilides. If the amount of the acetoacetylation product is less than 0.3 mol %, any effect of the acetoacetylation product on improvement of fluidity, etc., is not obtained. Further, even if the amount is more than 30 mol %, any effect corresponding to the increased portion of the acetoacetylation product is not obtained, and an adverse effect is sometimes exerted on a printing ink.

Examples of the acetoacetanildes in the present invention include, in addition to acetoacetanilde, acetoaceto-o-toluidide, acetoaceto-o-anisidide, etc., wherein at least one of a methyl group, a methoxy group, a nitro group or a halogen atom is substituted on the benzene nucleus of the acetoacetanilide for a hydrogen atom.

Typical examples of the compound of formula (1) include 1,3-diaminopropane, 1,4-diaminobutane, 1,6-diaminohexane, 1,8-diaminooctane, methyliminobispropylamine, phenyliminobispropylamine, benzyliminobispropylamine, iminobispropylamine, diethylenetriamine, triethylenetetramine, tetraethylenepentamine, pentaethylenehexamine, etc.

The acetoacetylation reaction of the compound of formula (1) is well known, and carried out in many ways. It is preferable that the acetoacetylation product is produced by adding diketene to a water solution or diluted acetic acid solution of said amine compound. The resultant acetoacetylation product of the compound of formula (1) is in a solution state. The degree of acetoacetylation is 2 when the compound of formula (1) is diamine since two terminals of the compound are acetoacetylated, and it is sometimes more than 2 when Q in formula (1) represents a compound of formula (2) since the secondary amine portion(s) of the resultant polyamine molecule is further acetoacetylated.

In the present invention, 3,3'-dichlorobenzidine or 3,3'-dibromobenzidine is preferably usable as dihalogenobenzidine. In the present invention, 3,3'-dichlorobenzidine is typically used as dihalogenobenzidine.

The pigment composition of the present invention can be obtained by the following process which comprises:

(1) carrying out a coupling reaction between a tetrazo compound of 3,3'-dichlorobenzidine and acetoacetanilides in the copresence of acetoacetanilides and an acetoacetylation product of the compound of formula (1) (mixture coupling), (2) mixing a pigment composition obtained by reacting a tetrazo compound of 3,3'-dichlorobenzidine with acetoacetanilides and a pigment composition obtained from a coupling reaction between such a tetrazo compound and the acetoacetylation product of the compound of formula (1), (3) forming a monoazodiazonium compound in the form of A—N=N—B—N$_2$+ wherein A represents an acetoacetylation product moiety of the compound of formula (1), B represents a moiety of 3,3'-dichlorobenzidine, and then carrying out its coupling reaction with acetanilides, or (4) mixing a pigment composition obtained by a reaction between a tetrazo compound of 3,3'-dichlorobenzidine and acetanilide, with the pigment composition obtained in the above (3).

In view of the number of production steps and effect, the process mentioned in the above (1) is the most preferable.

The pigment composition of the present invention may contain auxiliaries such as a surface active agent, amine, etc.

The present invention will be illustrated by referring to Examples, in which part and % stand for part by weight and % by weight.

When the pigment composition of the present invention is used in a printing ink, e.g. gravure ink, etc., the printing ink can give excellent fluidity, and the amount of a solvent for adjustment of the viscosity can be minimized. As a result, a printing ink using the pigment composition of the present invention exhibits excellent gloss on the ink coating and tinting strength, and further, it shows excellent storage stability.

EXAMPLE 1

17.1 parts of 3,3'-dichlorobenzidine hydrochloride and 15.5 parts of 35% hydrochloric acid were added to 200 parts of water. After the resultant slurry was cooled to 0° C., 38.5 parts of a 20% sodium nitrite solution was added to the slurry, and mixture was stirred for 1 hour to give a solution. The solution was filtered, and a small amount of sulfamic acid was added to the filtrate to prepare a solution of tetrazotized 3,3'-dichlorobenzidine. Separately, 20 parts of acetoacet-o-toluidide and 9.2 parts of sodium hydroxide were added to and dissolved in 200 parts of water. Added gradually to this solution was 147 parts of a 10% acetic acid solution to prepare a suspension. 0.75 part of an acetoacetylation product of triethylenetetramine was added to the suspension, and the mixture was stirred for 5 minutes. The above tetrazo solution was added to this mixture over 30 minutes, during which the coupling reaction was maintained at about 20° C. The resultant slurry was filtered, and a remaining solid was washed with water to give a pigment composition. The pigment composition was dried at 90° C.

The acetoacetylation product of triethylenetetramine used in this Example was prepared by dissolving 15 parts of triethylenetetramine in 150 parts of water, gradually adding 31 parts of diketene, and then heating the resultant mixture to 60° C.

EXAMPLE 2

A solution of tetrazotized 3,3'-dichlorobenzidine and a suspension of acetoaceto-o-toluidide were prepared in the same way as in Example 1, and a coupling reaction was carried out to give a slurry of a pigment composition.

Separately, 0.92 part of sodium hydroxide, 14.7 parts of a 10% acetic acid solution and 0.75 part of an acetoacetylation product of triethylenetetramine were added to 20 parts of water to prepare a solution. By using this solution and a solution of tetrazotized 3,3'-dichlorobenzidine, a coupling reaction was carried out to give a slurry of a pigment composition.

These two slurries were mixed homogeneously. Then, the resultant homogeneous slurry was filtered, and a remaining solid was washed with water to give a pigment composition. The pigment composition was dried at 90° C.

COMPARATIVE EXAMPLE 1

A pigment composition was prepared by repeating Example 1 except that no acetoacetylation product of triethylenetetramine was added.

EXAMPLE 3

Example 1 was repeated to prepare a slurry of a pigment composition except the use of 20 parts of acetoaceto-p-toluidide in place of acetoaceto-o-toluidide and an acetoacetylation product of 1.0 part of tetraethylenepentamine in place of triethylenetetramine. The acetoacetylation product of tetraethylenepentamine was prepared in the same way as in Example 1. 4.2 parts of 3-beef tallow aminopropylamine was added to a diluted acetic acid solution and dissolved in the solution under heat. Then, the solution was added to the above coupled slurry, and the pH of the slurry was adjusted to about 11 by using a sodium hydroxide solution. The resultant slurry was filtered, and a remaining solid was washed with water and dried at 90° C. to give a pigment composition.

EXAMPLE 4

Example 2 was repeated to prepare slurries of pigment compositions except the use of 20 parts of acetoaceto-p-toluidide in place of acetoaceto-o-toluidide and an acetoacetylation product of tetraethylenepentamine in place of the acetoacetylation product of triethylenetetramine. The slurries were mixed, and then 4.2 parts of 3-beef tallow aminopropylamine was added in the same way as in Example 3, and the procedure of Example 3 was repeated to give a pigment composition.

EXAMPLE 5

A solution of tetrazotized 3,3'-dichlorobenzidine was obtained in the same way as in Example 1. An acetoacetylation product of 1.0 part of tetraethylenepentamine was added to the tetrazo solution with stirring at 0° to 10° C., and the mixture was stirred for 30 minutes.

A suspension was prepared in the same way as in Example 1 except the use of 20 parts of acetoaceto-p-toluidide in place of acetoaceto-o-toluidide. The above tetrazo solution containing the acetoacetylation product of tetraethylenepentamine was added to the suspension over about 30 minutes, during which the reaction was maintained at 20° C. Then, after the resultant slurry was heated to 50° C., 4.2 parts of 3-beef tallow aminopropylamine was added in the same way as in Example 3, and the procedure in Example 3 was repeated to give a pigment composition.

COMPARATIVE EXAMPLE 2

Example 3 was repeated except that no acetoacetylation product of tetraethylenepentamine was added.

EXAMPLE 6

A pigment composition was produced by repeating Example 3 except the use of 21.5 parts of acetoaceto-p-anisidide in place of acetoaceto-p-toluidide and 0.77 part of methyliminobispropylamine in place of tetraethylenepentamine. An acetoacetylation product of the methyliminobispropylamine was prepared in the same way as in Example 1.

EXAMPLE 3

Example 6 was repeated except that no acetoacetylation product of methyliminobispropylamine was added.

EXAMPLE 7

A pigment composition was produced by repeating Example 3 except the use of an acetoacetylation product of 0.6 part of hexamethylenediamine in place of the acetoacetylation product of tetraethylenepentamine. The acetoacetylation product of the hexamethylenediamine was prepared in the same way as in Example 1.

COMPARISON TEST

Gravure inks using the pigment compositions obtained in Examples and Comparative Examples were compared on fluidity, gloss and reflective density. With regard to each of the pigment compositions obtained in Examples 1 and 2 and Comparative Example 1, an ink was prepared by mixing 10 parts of the pigment composition with 70 parts of nitrocellulose-based varnish (nonvolatile content 31%) and 20 parts of a solvent, and dispersing the mixture in a paint conditioner. Concerning each of the pigment compositions obtained in Examples 3, 4, 5, 6 and 7 and Comparative Examples 2 and 3, an ink was prepared by mixing 10 parts of the pigment composition with 80 parts of lime rosin (nonvolatile content 50%) and 10 parts of a solvent and dispersing the mixture in a paint conditioner.

In the test, the prepared inks were examined after they were left to stand at 25° C. for 10 days.

A. Fluidity

A BM model rotational viscometer was used to measure viscosities at 6, 12, 30 and 60 rpm (at a measurement temperature of 25±1° C.), and the results were elevated by using the following three grades.

O: excellent
Δ: good
X: poor

B. Gloss and reflective density

With regard to the above nitrocellulose-based inks, a solvent was added to each of them and adjusted so as to show 25±0.5 seconds in a No. 3 Zahn cup. Then, each of these inks was used to carry out printing on a triacetate film on a printing machine. Concerning the above lime rosin-based inks, a solvent was added to each of them and adjusted so as to show 14±0.5 seconds in a No. 3 Zahn cup. Then, each of these inks was used to carry out printing on wood free paper on a printing machine. Thereafter, the gloss and density of each of the prints were measured by using a glossmeter and a reflection densitometer. The results were evaluated by using the following three grades and are shown in Table 1.

O: excellent
Δ: good
X: poor

TABLE 1

| | Fluidity | Gloss | Reflective density |
|---|---|---|---|
| Example 1 | O | O | O |
| Example 2 | Δ | Δ | Δ~O |
| C-Ex. 1 | X | X | X |
| Example 3 | O | O | O |
| Example 4 | Δ~O | Δ~O | O |
| Example 5 | Δ~O | Δ~O | Δ |
| Example 6 | Δ~O | O | O |
| Example 7 | Δ~O | Δ~O | Δ~O |
| C-Ex. 2 | X | X | X |
| C-Ex. 3 | X | X | X |

What is claimed is:

1. A disazo pigment composition comprising 99.7 to 70 mol % of a coupling reaction product between a tetrazotized dihalogenobenzidine and acetoacetanilide, and 0.3 to 30 mol % of a coupling reaction product between an acetoacetylation product formed by acetoacetylation of two terminal amines of a compound of the formula (1)

$$H_2N-Q-NH_2 \quad (1)$$

wherein Q is a linear saturated hydrocarbon radical having 2 to 10 carbon atoms or a compound of the formula (2)

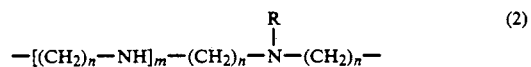

$$-[(CH_2)_n-NH]_m-(CH_2)_n-\overset{R}{\underset{|}{N}}-(CH_2)_n- \quad (2)$$

in which R is selected from the group consisting of hydrogen, lower alkyl, phenyl and benzyl, n is an integer of 2 to 4, and m is an integer of 0 to 5, and a tetrazotized dihalogenobenzidine.

2. A disazo pigment composition according to claim 1 wherein Q in formula (1) represents a compound of formula (2).

3. A disazo pigment composition according to claim 1 wherein at least one of methyl, methoxy, nitro or halogen is substituted on the benzene nucleus of the acetoacetanilide.

4. A disazo pigment composition according to claim 1 wherein the acetoacetylation product has at least two acetoacetylated amines.

5. A disazo pigment composition according to claim 1 which is a coupling reaction product between the tetrazotized dihalogenobenzidine and acetoacetanilide in the copresence of an acetoacetylation product of the compound of formula (1).

6. A disazo pigment composition according to claim 1 which is a mixture of a disazo pigment obtained from a coupling reaction between the tetrazotized dihalogenobenzidine and acetoacetanilide with a disazo pigment obtained from a coupling reaction between a tetrazotized dihalogenobenzidine and an acetoacetylation product of the compound of formula (1).

7. A disazo pigment composition according to claim 1 wherein the dihalogenobenzidine represents 3,3'-dichlorobenzidine or 3,3'-dibromobenzidine.

8. A disazo pigment composition according to claim 1, wherein Q in the formula (1) is a linear saturated hydrocarbon radical having 2 to 10 carbon atoms.

* * * * *